United States Patent [19]

Gaus

[11] Patent Number: 4,545,211

[45] Date of Patent: Oct. 8, 1985

[54] COLD BOX FOR MOTOR VEHICLES

[76] Inventor: Ernst Gaus, Klammweg 72, D-7500 Karlsruhe 31, Fed. Rep. of Germany

[21] Appl. No.: 556,346

[22] Filed: Nov. 30, 1983

[30] Foreign Application Priority Data

Aug. 4, 1983 [DE] Fed. Rep. of Germany ....... 3328120

[51] Int. Cl.$^4$ .............................................. B60H 3/04
[52] U.S. Cl. ........................................ 62/115; 62/244; 62/258; 296/24 B; 296/37.8
[58] Field of Search ............... 62/244, 239, 258, 115; 296/37.8, 37.14, 24 B

[56] References Cited

U.S. PATENT DOCUMENTS

| | | | |
|---|---|---|---|
| 1,938,141 | 12/1933 | Goldkind | 62/244 X |
| 1,983,056 | 12/1934 | Teichmann | 62/244 X |
| 2,358,071 | 9/1944 | Hurtado | 62/244 X |
| 2,512,077 | 6/1950 | Walker | 62/239 X |
| 3,022,107 | 2/1962 | Daniels | 296/37.8 |
| 3,177,033 | 4/1965 | Daniels | 296/37.8 |
| 3,444,700 | 5/1969 | Beyer | 62/239 X |
| 3,498,076 | 3/1970 | Michael | 62/244 |
| 4,236,749 | 12/1980 | Schluns | 62/244 X |
| 4,258,555 | 3/1981 | Scharm et al. | 62/244 |
| 4,423,812 | 1/1984 | Sato | 296/37.8 X |

FOREIGN PATENT DOCUMENTS 140280  8/1982  Japan ................................. 296/37.8

Primary Examiner—William E. Tapolcai
Attorney, Agent, or Firm—Horst M. Kasper

[57] ABSTRACT

A cold box is provided for motor vehicles or similar mobile crafts, and in particular for passenger cars. The cold box is an apparatus to be built into the motor vehicle between two seats disposed next to each other and at a distance from each other. The cold chamber is disposed above a console pedestal containing the refrigeration aggregate. The cold box can be reached and operated from the passenger seats and the passengers of such a vehicle can take the cooled goods from the cooling chamber without a change in their seating position. Advantageously, the door for access to the cold chamber can have a rest position when open, which is horizontal such that cooled goods can be placed there for short times.

20 Claims, 3 Drawing Figures

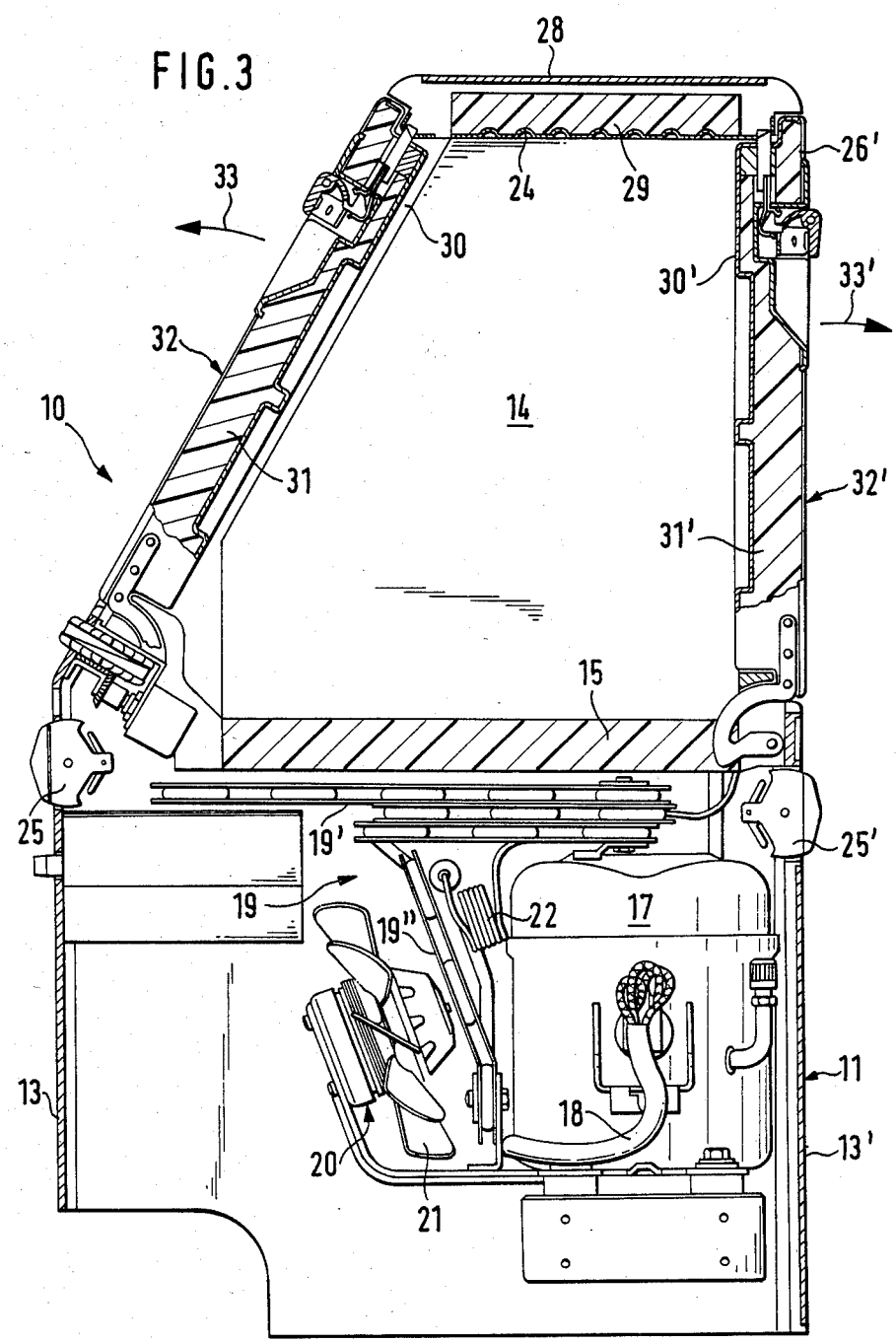

COLD BOX FOR MOTOR VEHICLES

BACKGROUND OF THE INVENTION

1. Field of the Invention

The invention relates to a cold box or cooler for motor vehicles or similar mobile provisions, which have their own on board electric power supply grid and in particular for passenger motor vehicles, where a refrigerant compressor of a refrigeration plant supplying a cooling chamber, which is provided with at least one closable filling and removal opening, is driven by an electric motor connectable to the on board electric power supply grid.

Known cooling boxes of this kind are for example employed in modern overland and long distance buses in order to have available beverages and other cooled items for the passengers of the bus. The boxes are chest-like containers, which are placed at a suitable location in the space for the passengers and which have on top or the cooling chamber a filling and emptying opening, which can be closed with a flap or a cover. The refrigeration aggregate, comprising a condenser following the compressor in the refrigerant cycle, is disposed below or on the side of the cooling chamber in such provisions, while the evaporator contained in the cooling chamber follows the condenser via an expansion unit, which in general is provided by a capillary.

Cooling boxes of this kind cannot be used in motor vehicles with limited space in view of their space requirements, since they require an area corresponding about to a seat in a vehicle. Therefore, the need for a cooling box on board cannot be satisfied with the available apparatus in particular with passenger motor vehicles, but also in the case of pleasure boats and sport and private aircraft.

2. Purpose of the Invention

It is an object of the present invention to provide a cold box for confined and/or cramped quarters.

It is a further object of the invention to provide a cold box suitable for motor vehicles and private aircraft and which requires only limited space which is unsuitable for other functional provisions.

It is another object of the present invention to provide a cooler, which constructed to serve as a built-in unit for motor vehicles and which can easily be mounted, exchanged or removed.

These and other objects and advantages of the present invention will become evident from the description which follows.

BRIEF DESCRIPTION OF THE INVENTION

The present invention provides a cooler provision for motor vehicle having an electrical power supply line grid. A motor is connected to the electrical power supply line grid. A refeigeration compressor is mechanically connected to the motor to be driven by the motor. A condenser is connected to the refrigeration compressor to receive and cool pressurized refrigeration medium coming from the compressor. A cold chamber is placed on a pedestal located between two seats for persons, which seats are disposed at a distance and in parallel to each other on the motor vehicle. An evaporator is disposed closely adjacent to the cold chamber and fed with refrigeration medium by the condenser via an expansion provision to provide cooling to the cold chamber. A door provision is disposed in the cold chamber to allow the cold chamber to be filled with goods or to be emptied of goods.

The cold chamber can be provided as a built-in unit. The pedestal can be provided between the seat cushions of the seats and the cooling chamber can be provided between the back cushions of the seats. The pedestal can contain the cooling aggregates and the condenser. The cold chamber can extend to the rear beyond the thickness of the seat cushions of the vehicle seats up to about the seat cushions of rear vehicle seats. In addition, the cold chamber can extend beyond the depth of rear passenger seats.

The door provision preferably comprises an opening in the cold chamber, and a hinged door adapted to match the opening and to be placed in a horizontal rest position while the chamber is open, which horizontal position provides a storage surface like a little table or a tray for the goods taken from the cold chamber. Preferably, the opening in the cold chamber is located in a front wall of the cold chamber after mounting of the chamber between the back cushions of the seats. The door can be constructed as a flap hinged at the bottom edge of the opening and tiltable into a horizontal open position.

A filling and emptying opening can be provided in the wall confining the cold chamber in the rear. A door serves to close the opening, which door is hinged at the lower edge of the opening such that it can be moved into a horizontal rest position. This allows easy access to the cooling chamber from the rear seats of the motor car.

A forced air cooling system can be provided for the condenser. At least part of the air flow provided by forced air cooling system for the condenser can be fresh air fed in directly from the outside. A blower controlled by a drive control of the motor of the refrigeration compressor can furnish forced cooling to the condenser. Preferably, grills are incorporated in the region of front and/or rear walls of the pedestal for air circulation of the cooling air of the condenser. These grills can serve the incoming air as well as the waste air after passing the condenser. These grills can serve to vent the condenser to the inner space of the motor vehicle.

There is also provided a method for bringing cooled goods to passengers of motor vehicles, which comprises disposing at least two seats in parallel, but at a distance from each other, placing between the seats a pedestal, mounting onto the pedestal between the two seats a cold box, and filling goods into the cold box and/or removing goods from the cold box from the front side of a cold chamber having an opening for filling and removing goods from the front side of the cold box.

Preferably, an opening is left on a front side of the cold box, a door is hinged at the lower edge of the opening on the front side, and the door plane is supported in a horizontal position when the door is open. Refrigerant can be cycled through a compressor, a condenser, an expansion provision and an evaporator, which are mounted with the cold box on the pedestal. A motor can be connected to anon board electric power supply grid of the motor vehicle, and the power can be mechanically transmitted from the motor to a refrigeration compressor. The condenser can be cooled with forced air from a ventilator, and preferably the ventilator at least in part moves fresh air from outside of the vehicle past the condenser.

The invention thus provides a cold box which is constructed and designed for incorporation into the free space between neighboring seats, which is already present in vehicles of the kind considered here. In particular, in the case of passenger cars the space is between the two front seats disposed at a distance from each other.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 3 is a vertical in part sectional view along section line III—III of FIG. 2 through the cold box.

DESCRIPTION OF INVENTION AND PREFERRED EMBODIMENTS

Figure 1:
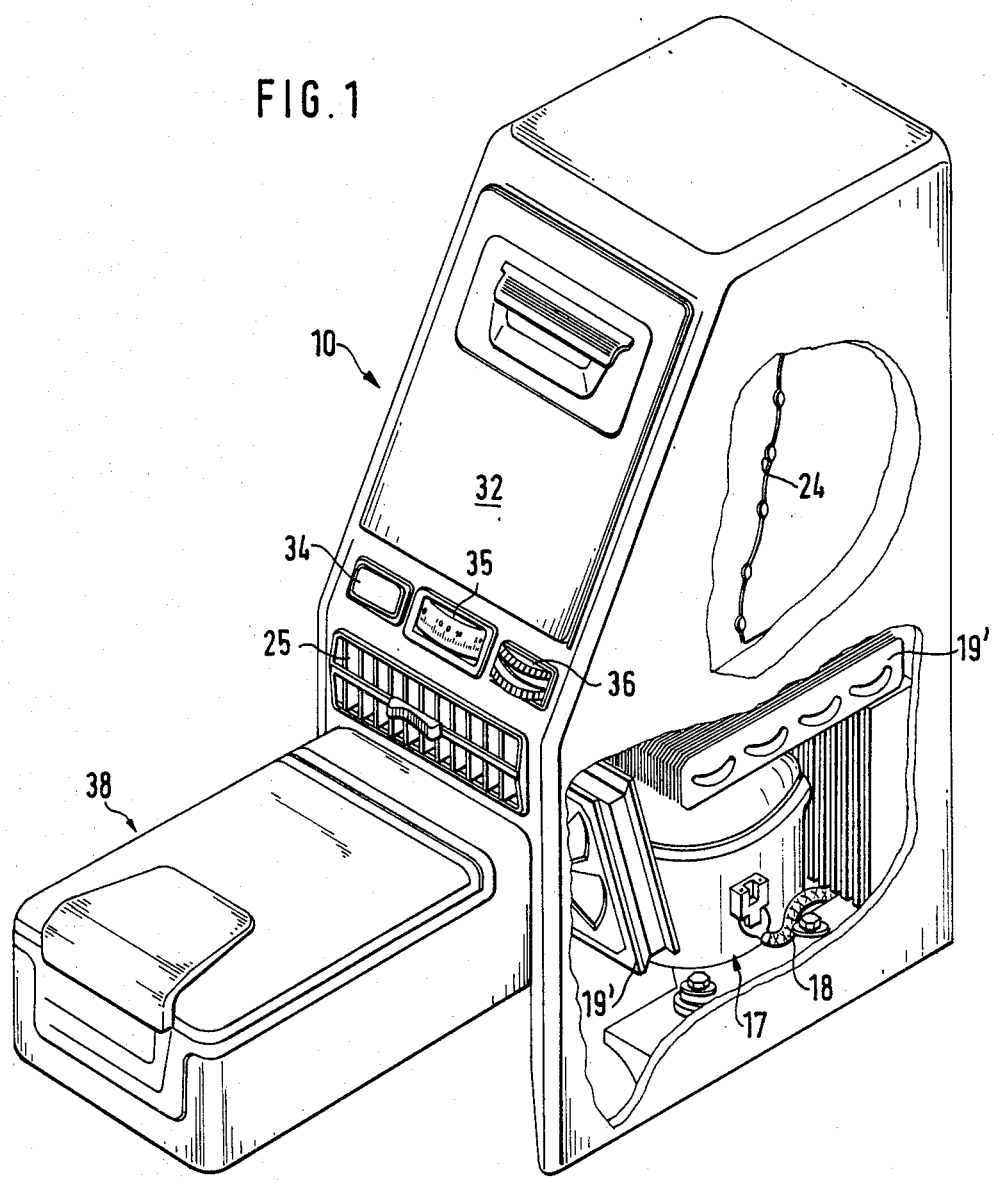
FIG. 1 is a perspective and in part sectional overall view of a cold box according to the invention, which is constructed for incorporation between the front seats of a passenger motor vehicle.

In accordance with the present invention there is provided a cold box 10 for motor vehicles or similar mobile crafts carrying an electrical power supply grid, and in particular for a passenger vehicle, where a refrigeration compressor is driven by an electric motor connected to the supply grid and where the refrigeration compressor supplies a cooling chamber, which comprises at least one opening for filling and emptying, wherein the cold box 10 is provided as a built-in aggregate to be positioned between two vehicular seats disposed at a distance next to each other, where the refrigeration aggregate 17 is disposed with the refrigeration compressor in the refrigerant cycle together with a following condenser 19 within a stand console 11 positioned between the vehicle seats and where the cooling chamber 14 is disposed on the stand console 11 above the refrigeration aggregate 17 with an evaporator 24 following the condenser 19 via an expansion unit 22.

The cold box 10 can be produced to fit between the back cushions of two seats of a motor vehicle. The cold box 10 perferably has an opening 30, 30' on the side of the seats and a hinged door 32, 32', where the door hinge is at the bottom edge of the opening and where the open door has a horizontal rest position.

The invention cold box 10 is provided with an about rectangular pedestal 11 as seen from above, which is open toward the bottom and which is surrounded on the side by side and front faces 12, 12' and 13, 13' running in each case parallel to each other and on the top by a wall 15 limiting on the lower side, the cooling chamber 14, which is placed on the pedestal on top of the cooling aggregate. The compressor capsule 17 of the refrigeration aggregate contained in the pedestal 11 is disposed within the pedestal 11 on console supports 16, which extend between the side walls 12, 12'. The compressor capsule 17 contains as is known the refrigeration compressor and an electric motor driving the compressor. The electric motor is connected to the on bord electrical power supply grid of a vehicle supplied with such a cold box via a line connection 18 shown in FIGS. 1 and 3.

The condenser 19 is provided as a conventional multitubular surface condenser and follows the refrigeration compressor in the cooling cycle. The condenser 19 comprises a heat exchanger 19' extending under the lower wall 15 of the cooling chamber 14 closing the pedestal 11 at the top. The condenser 19 includes heat exchange tubes running in several layers and a tubular exchanger 19" extending upward at an inclined angle in the pedestal 11 and connected to the console supports 16 adjacent to the compressor capsule 17. The console supports 16 support the compressor capsule 17. A blower 20 with a fan wheel 21 running in a plane parallel to said tubular exchanger is disposed on the side of the tubular exchanger 19", which is remote from the compressor capsule 17. The blower 20 provides the forced cooling of the condenser 19" and is controlled depending on the control of the drive motor for the refrigeration compressor. The condenser 19 following the compressor in the refrigeration cycle is followed in turn by an expansion provision 22, which is provided as a spirally shaped capillary, which in turn is in flow connection with the evaporator 24 disposed in the cooling space of the cold chamber 14 of the cold box. A return conduit for the refrigerant runs in a conventional way to the refrigeration compressor contained in the compressor capsule 17.

Furthermore, the pedestal 11 is provided with in each case an air intake and an air exhaust grill 25, 25' in the region of its front or rear side front faces 13, 13' immediately under the cold chamber 14. The air intake and the air exhaust grill are disposed such that cooling air coming in via the intake grill 25 and flowing off via the air exhaust grill pass over the tubular heat exchanger 19' placed under the lower end closure wall 15 of the cold chamber 14. The flow of this cooling air, which is taken from the passenger space of a vehicle equipped with such a cooling box, is supported by the operation of the blower 20 providing the forced cooling, which is on the other hand disposed such that an air stream generated with the fan wheel 21 flows immediately through the tubular heat exchanger 19" disposed at an angle in the pedestal 11. This disposition of the tubular heat exchanger 19" and of the blower 20 with a fan wheel 21 disposed in parallel position relative to the latter heat exchanger was selected such that in case of certain vehicles where a fresh air channel opens in the region between the front seats for feeding fresh air into the passenger compartment and such that based on the blower 20 a direct forced air flow around the heat exchanger of the condenser is achieved with fresh air fed in from the outside.

Figure 2:
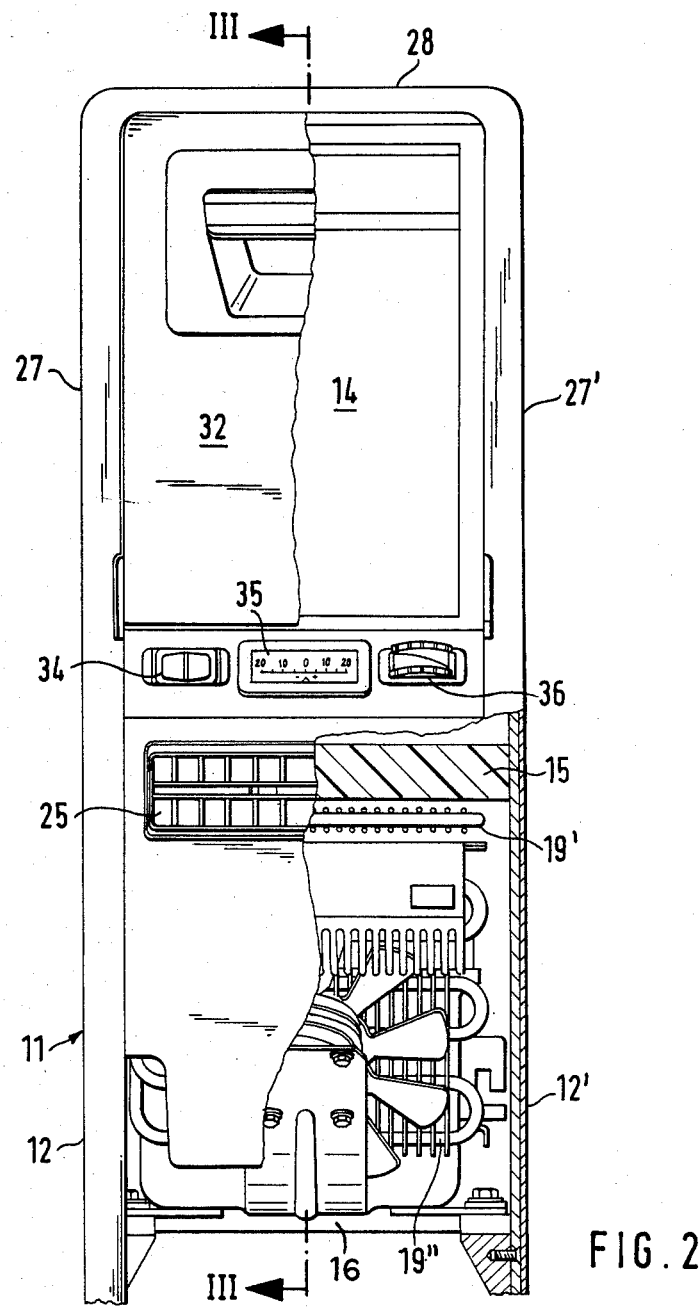
FIG. 2 is a front elevational view, partially in section, of the cold box.

The width of the cold box as seen in FIG. 2 corresponds approximately to the space between the front seats of the passenger motor vehicle in view of the intention of building the cold box 10 into the interspace between the front seats. Since in general a convex tunnel protruding into the passenger compartment extends along the longitudinal axis of the vehicle, which for example in the case of vehicles with rear wheel drive provides space for the Cardan propeller shaft, the side walls 12, 12' of the pedestal 11 are pulled down over the console supports 16 disposed between the side walls 12, 12', while the front walls 13, 13' closing the pedestal on the front and rear faces have recesses corresponding to a tunnel shape. The depth of the cooler box and correspondingly also the depth of the pedestal are selected such that the front wall 13 of the pedestal lies at about the front edge of the back cushions of the front seats in a vehicle equipped with such a cold box. The pedestal then reaches back to the front edge of a rear seat bank or of the rear seat cushions of the rear seats of a vehicle. The cold chamber 14 held via the pedestal 11 is closed off on the front side by a front wall 26 inclined toward the back and running at an angle of about 25 degress upwardly. The rear front wall 26' and the two side walls 27, 27' of the cold chamber 14 run aligned with regard to the corresponding walls of the pedestal.

This inclination of the front wall 26 closing the cold chamber 14 on the front side corresponds approximately to the regualar inclination of the back cushions of the front seats of the motor vehicle, which have the cold box placed between them. The cooling chamber 14 is closed on the top side by a wall 28, which runs approximately at the level of the upper edge of the back cushions of such vehicle seats. The walls surrounding the cold chamber 14 are provided with an inner wall insulating material covering 29 in the way usual with cooling chambers. Finally, the cold chamber 14 is provided with two loading and unloading openings 30, 30', which are disposed in the limiting walls 26, 26' located oppositely on the front and back faces and which can be closed by flaps 32, 32' hinged in the area of the lower edges of these openings, which openings again are provided with insulating material coverings 31, 31' on their inside walls. The closure positions are shown in FIG. 3 and these flaps 32, 32' can be swung around their hinge axes in the direction of the rotary arrows 33, 33' into horizontal positions, whereby loading and unloading openings are released, and the recited flaps upon opening provide tilted storage surfaces in their opening positions in the front between the front seats or, respectively, in the rear on the seat cushions of rear seats.

An on and off switch 34, a display instrument 35 for showing the temperature prevailing in each case in the cooling chamber 14 and a rotary switch 36 for setting a thermostat for controlling the temperature in the cooling chamber are disposed next to each other in sequence between the front flap 32 of the cooling chamber 14 and the air ventilation grill 25 for the intake air for cooling the condenser 19 of the refrigeration aggregate contained in the pedestal 11. Furthermore, FIG. 1 shows a pidgeon hole 38 for storing materials, which pidgeon hole extends forward under the air intake grill from the front wall 13 of the pedestal.

It can be recognized that the invention cold box can be installed in a passenger motor vehicle without interfering with the use of valuable space and that the cold chamber 14 can be operated from the front seats of such a vehicle without problems. In addition, the cold chamber allows easy access to the flaps closing the unloading and loading openings from the front and rear seats of a vehicle equally. An optimum supply situation is thus provided for the motor vehicle passengers, who can reach the cooled goods in the cooling chamber without a substantial change in their seating position.

It will be understood that each of the elements described above, or two or more together, may also find a useful application in other types of refrigeration system configurations and food supply procedures differing from the types described above.

While the invention has been illustrated and described as embodied in the context of a cold box for motor vehicles or similar mobile provisions, in particular for passenger cars, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essentail characteristics of the generic or specific aspects of this invention.

What is claimed as new and desired to be protected by Letters Patent is set forth in the appended claims.

I claim:

1. A cold box for motor vehicles having an electrical power supply line grid comprising a motor connected to the electrical power supply line grid; a refrigeration compressor mechanically connected to the motor to be driven by the motor; a condenser connected to the refrigeration compressor to receive from the compressor pressurized refrigeration medium to be cooled;
   a pedestal located between two seats, said seats being disposed adjacent to each other and parellel to each other in a motor vehicle, said seats being provided with back cushions;
   a cold chamber placed on the pedestal such that the front wall of the cold chamber corresponds approximately to the inclination of the back cushions of the seat; an evaporator disposed closely adjacent to the cold chamber and fed with refrigeration medium by the condenser via an expansion provision to provide cooling to the cold chamber; and
   door provision disposed at the cold chamber for allowing the cold chamber to be filled with goods or to be emptied of goods.

2. The cold box for motor vehicles according to claim 1 wherein the cold chamber is provided as a built-in unit.

3. The cold box for motor vehicles according to claim 1 wherein the pedestal is provided between the seat cushions of the seats and wherein the cooling chamber is provided between the back cushions of the seats.

4. The cold box for motor vehicles according to claim 3 wherein the cold chamber extends to the rear beyond the thickness of the seat cushions of the vehicle seats up to about the seat cushions of rear vehicle seats.

5. The cold box for motor vehicles according to claim 3 wherein the cold chamber extends beyond the depth of rear passenger seats.

6. The cold box for motor vehicles according to claim 3 wherein the door provision comprises
   an opening in the cold chamber; and
   a hinged door adapted to match the opening and to be placed in a horizontal rest position while the chamber is open, which horizontal position provided a storage surface.

7. The cold box for motor vehicles according to claim 6 wherein the opening in the cold chamber is located in a front wall of the cold chamber after mounting of the chamber between the back cushions of the seats and wherein the door is constructed as a flap hinged at the bottom edge of the opening and tiltable into a horizontal open position.

8. The cold box for motor vehicles according to claim 6 further comprising
   a filling and emptying opening in the wall confining the cold chamber in the rear; and a door for the opening, which is hinged at the lower edge of the opening such that it can be moved into a horizontal rest position.

9. The cold box for motor vehicles according to claim 1 further comprising a forced air cooling system for the condenser.

10. The cold box for motor vehicles according to claim 1 further comprising a forced air cooling system for the condenser where at least part of the air flow employed is fresh air fed in directly from the outside.

11. The cold box for motor vehicles according to claim 1 further comprising a blower controlled by a drive control of the motor of the refrigeration compressor for furnishing forced cooling to the condenser.

12. The cold box for motor vehicles according to claim 1 further comprising grills in the region of front and/or rear walls of the pedestal for air circulation of the cooling air of the condenser.

13. A cold box for motor vehicles or similar mobile crafts carrying an electrical power supply grid, and in particular for a passenger vehicle, where a refrigeration compressor is driven by an electric motor connected to the supply grid and where the refrigeration compressor supplies a cooling chamber of the cold box, which comprises at least one opening for filling and emptying, a pedestal located between two seats, said seats being disposed adjacent other and parallel to each other in a motor vehicle, said seats being provided with back cushions, wherein the cold box is provided as a built-in aggregate to be positioned between the back cushions of said seats, where the aggregate is disposed with the refrigeration compressor in the refrigerant cycle together with a following condenser within the pedestal positioned between the vehcile seats and where the cooling chamber is disposed on the pedestal with an evaporator following the condenser via an expansion unit.

14. The cold box for motor vehicles according to claim 13 wherein the cold box is produced to fit between the back cushions of two seats of a motor vehicle.

15. The cold box for motor vehicles according to claim 13 wherein the cold box has an opening on the side of the seats and a hinged door, where the door hinge is at the bottom edge of the opening and where the open door has a horizontal rest position.

16. A method for bringing cooled goods to passengers of motor vehicles comprising
disposing at least two seats in parallel, but at a distance from each other, said seats being provided with back cushions;
placing between the seats a pedestal;
mounting onto the pedestal between the two seats a cold box, such that the front side of the cold box corresponds approximately to the inclination of the back cushions of the seats;
feeding an evaporator disposed closely adjacent to the cold box with refrigeration medium by the condenser via an expansion provision to provide cooling to the cold box; and filling goods into the cold box and/or removing goods from the cold box from the front side of a cold chamber having an opening for filling and removing goods from the front side of the cold box.

17. A method for bringing cooled goods to passengers of motor vehicles according to claim 16 further comprising leaving an opening on a front side of the cold box; hinging a door at the lower edge of the opening on the front side; and
supporting the door plane in a horizontal position when the door is open.

18. A method for bringing cooled goods to passengers of motor vehicles according to claim 16 further comprising
cycling refrigerant through a compressor, a condenser, an expansion provision and an evaporator, which are mounted with the cold box at the pedestal.

19. A method for bringing cooled goods to passengers of motor vehicles according to claim 18 further comprising connecting a motor to an on board electric power supply grid of the motor vehicle; and
transmitting mechanically the power from the motor to a refrigeration compressor.

20. A method for bringing cooled goods to passengers of motor vehicles according to claim 18 further comprising cooling the condenser with forced air from a ventilator, where the ventilator at least in part moves fresh air from the outside the vehicle past the condenser.

* * * * *